(12) United States Patent
Leung

(10) Patent No.: US 7,680,976 B2
(45) Date of Patent: Mar. 16, 2010

(54) METHOD AND APPARATUS FOR EMULATING REWRITABLE MEMORY WITH NON-REWRITABLE MEMORY IN AN MCU

(75) Inventor: Ka Y. Leung, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 429 days.

(21) Appl. No.: 11/695,014

(22) Filed: Mar. 31, 2007

(65) Prior Publication Data

US 2008/0244151 A1    Oct. 2, 2008

(51) Int. Cl.
*G06F 12/00* (2006.01)
(52) U.S. Cl. .................................. 711/103; 365/185.33
(58) Field of Classification Search .................. 711/103; 365/185.33
See application file for complete search history.

Primary Examiner—Christian P Chace
Assistant Examiner—Hashem Farrokh
(74) Attorney, Agent, or Firm—Howison & Arnott, LLP

(57) ABSTRACT

An integrated circuit having an embedded multiple time programmable memory includes a processing core for executing stored instructions with a data memory and a non volatile memory. The non-volatile memory block provides for storage of program instructions and includes a plurality of blocks of non-volatile memory, each of which can be written to once and read from many times and each having a size that is equal to or less than a program memory address space addressable by the processing core for output of data there from. It also includes a reserve storage location for storing a status word defining the one of the plurality of blocks addressable by the processing core, the status word operable to be changed in response to external signals when another of the plurality of blocks is to be selected, such that once another of the plurality of blocks is selected, the status word cannot indicate as addressable by the processing core a prior one of the plurality of blocks that was defined by the status word as being previously addressable by the processing core.

12 Claims, 4 Drawing Sheets

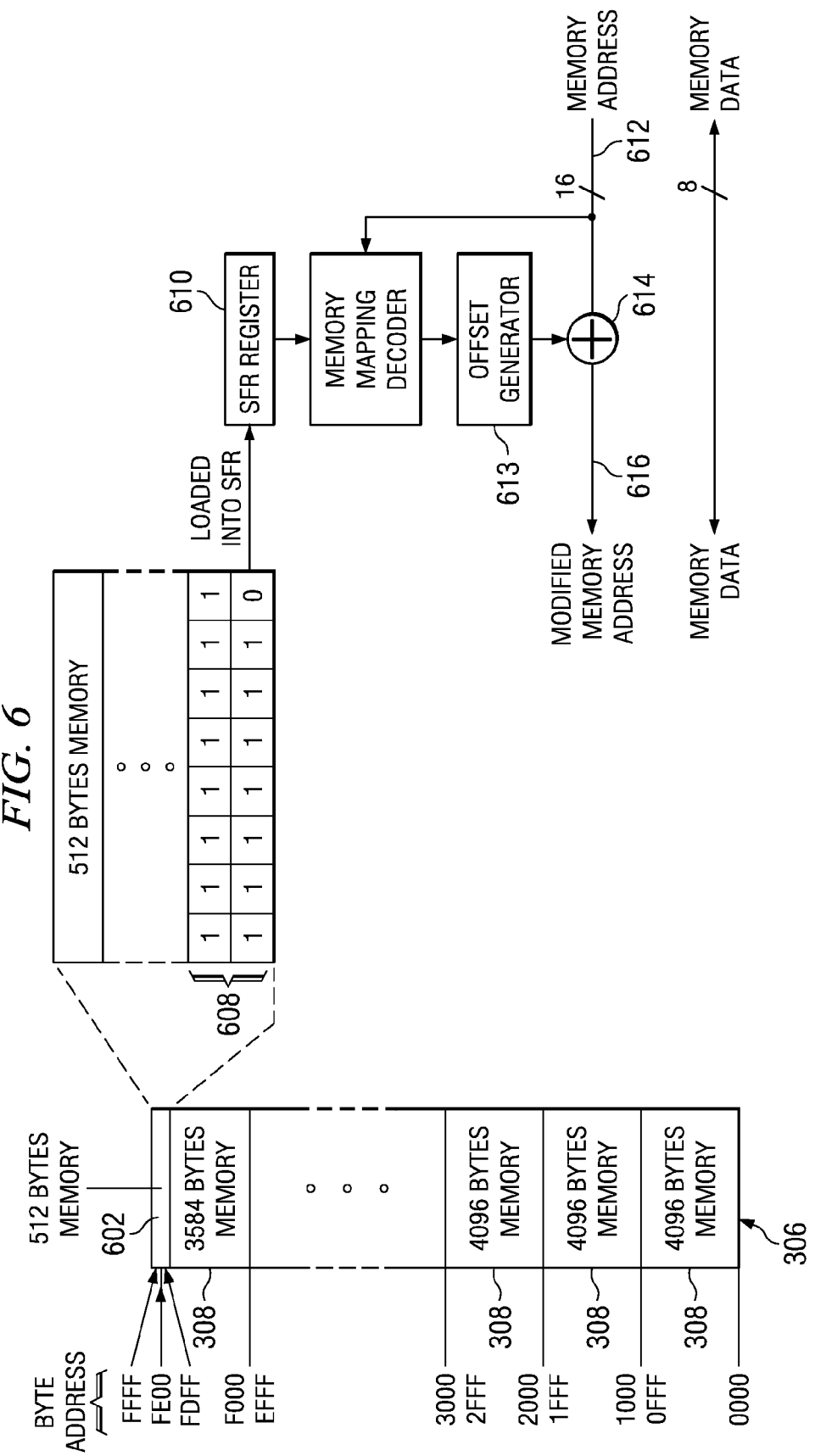

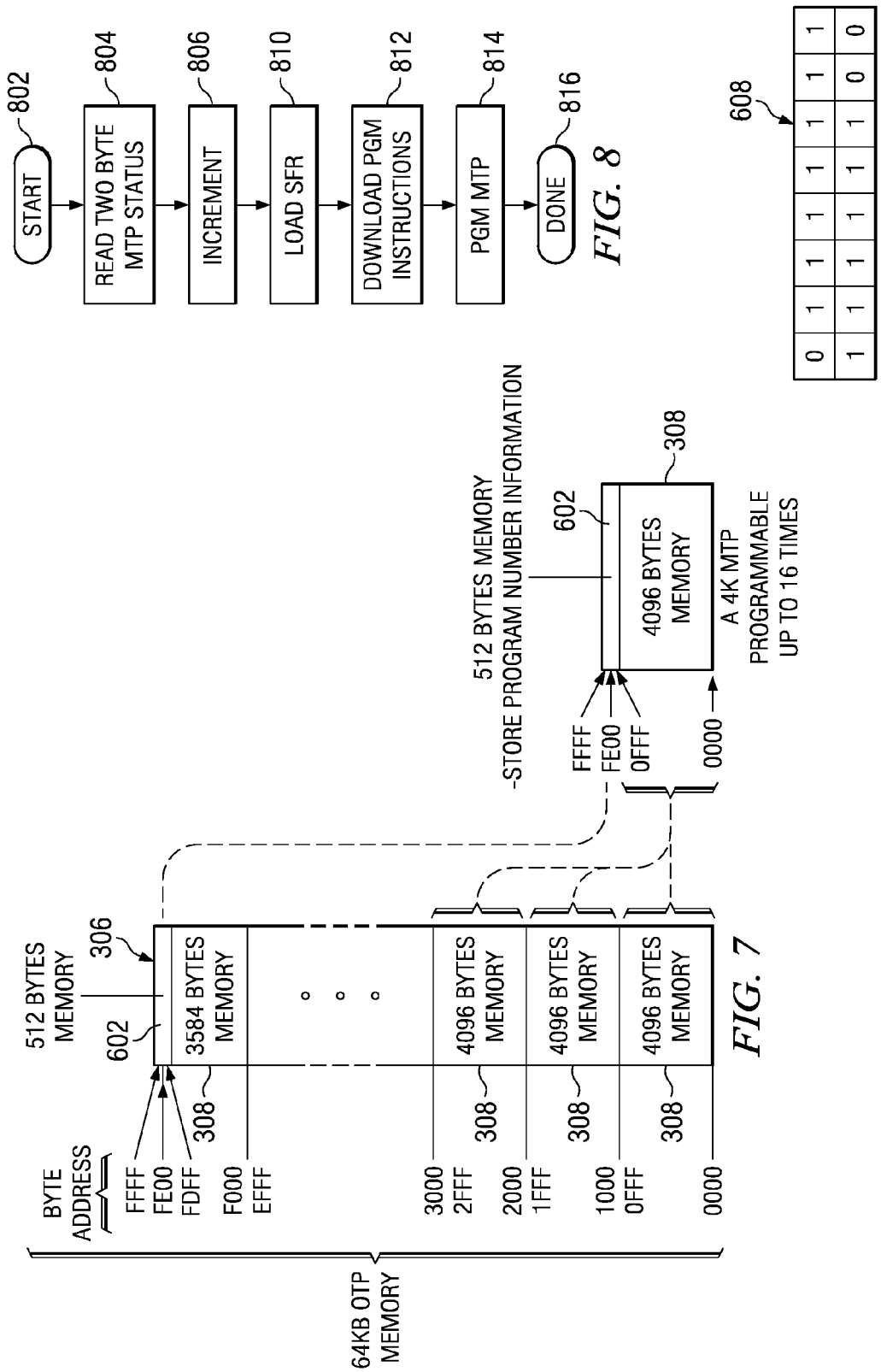

METHOD AND APPARATUS FOR EMULATING REWRITABLE MEMORY WITH NON-REWRITABLE MEMORY IN AN MCU

TECHNICAL FIELD

The present invention pertains in general to an integrated circuit with on-chip memory and, more particularly, to configuration memory integrated onto an MCU.

CROSS-REFERENCE TO RELATED APPLICATIONS

None.

BACKGROUND

As integrated circuit platforms become more and more complex and incorporate more and more functionality into a monolithic solution, there is an increasing need for non-volatile memory for the purpose of storing configuration information and the such. Typically, in the past, this functionality was achieved with the use of external non-volatile memory such as EEPROM. Unfortunately, this required a large number of pins to allow interfacing therewith. With the increased functionality, the additional pins become a commodity and the removal of such pins is desirable. As such, what has occurred is the incorporation of on-chip memory such as FLASH. This memory is useful for storing program instructions that will not be erased when power is removed. However, this memory is not useful for the normal operational aspects of the chip, wherein frequent Read and Write operations are required. For this purpose, SRAM is used, which is a volatile memory. This SRAM memory is faster and has substantially infinite reads and writes, whereas FLASH inherently has a limited number of reads and writes associated therewith from the standpoint that it "wears out" after a finite number of bit storage operations. Therefore, FLASH memory is limited to "program memory" for storing program instructions and configuration information whereas SRAM memory is used for data.

The problem with embedding FLASH into an integrated circuit is that the use of FLASH memory in a particular integrated circuit process requires a substantial increase in the number of process steps, thus increasing the complexity of the process. Thus, a wafer manufactured in a FLASH compatible process might contain five or six additional steps of processing over that for the underlying functional circuitry. This could increase the cost of the wafer by as much as 20%, not to mention the fact that the embedded FLASH memory will increase the size of the chip, thus further increasing the cost of the chip.

A less complex process is that of utilizing one time programmable memory (OTP). The use of the OTP requires less or no additional layers to realize the memory, but this also has a disadvantage in that it can only be programmed one time, after which it is permanently programmed and there is no possibility for chip reuse unless using high energy UV light source which is impractical from user point of view.

SUMMARY

The present invention disclosed and claimed herein, in one aspect thereof, comprises an integrated circuit having an embedded multiple time programmable memory. The IC includes a processing core for executing stored instructions. A non-volatile memory is provided for storing instructions and a volatile memory for storing data during operation of the processing core, the data memory occupying a data memory address space of the processing core. A non-volatile memory block provides for storage of program instructions for use by the processing core during operation thereof. The non-volatile memory includes a plurality of blocks of non-volatile memory, each of which can be written to once and read from many times and each having a size that is equal to or less than a program memory address space addressable by the processing core for output of data there from. It also includes a reserve storage location for storing a status word defining the one of the plurality of blocks addressable by the processing core, the status word operable to be changed in response to external signals when another of the plurality of blocks is to be selected, such that once another of the plurality of blocks is selected, the status word cannot indicate as addressable by the processing core a prior one of the plurality of blocks that was defined by the status word as being previously addressable by the processing core. An address mapping device provides for mapping of a program memory address within the program memory address space of the processing core to the one of the plurality of blocks indicated by the status word as being addressable by the processing core.

BRIEF DESCRIPTION OF THE DRAWINGS

For a more complete understanding of the present invention and the advantages thereof, reference is now made to the following description taken in conjunction with the accompanying Drawings in which:

FIG. 6 illustrates a diagrammatic view of memory address space;

FIG. 7 illustrates a diagrammatic view of the mapping of the memory to the usable address space;

FIG. 8 illustrates a flow chart for the programming information; and

FIG. 9 illustrates an alternate embodiment for defining different sizes of memory.

DETAILED DESCRIPTION

Figure 1:
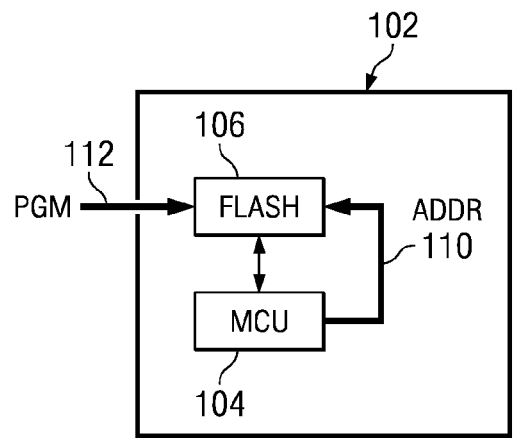
FIGS. 1 and 2 illustrate prior art integrated circuits with embedded Flash and OTP non-volatile memory incorporated with MCUs.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated a prior art integrated circuit 102 that is operable to contain thereon a microcontroller unit (MCU) 104 and FLASH memory 106. The FLASH memory 106 is basically non-volatile memory that can be written externally for the purpose of storing program instructions and configuration information therein.

Once programmed, the FLASH memory 106 will maintain the data contained therein when power is removed. However, the FLASH memory 106 can be rewritten to in the event that program instructions or configuration information must be altered. The MCU 104 can read information from the FLASH memory 106 or it can write information thereto. This is facilitated through addresses on an address line 110. Programming (writing of program instruction to the device) is performed through an external program BUS 112 typically referred to as a FLASH memory interface bus. One such integrated circuit is manufactured by Silicon Laboratories Inc. under the part numbers C8051F120 and C8051F130. The particular interface for these parts is referred to as a JTAG logic interface, a well known memory interface. This requires four pins in order to interface with the chip and write to or read from the FLASH memory 106.

Figure 2:
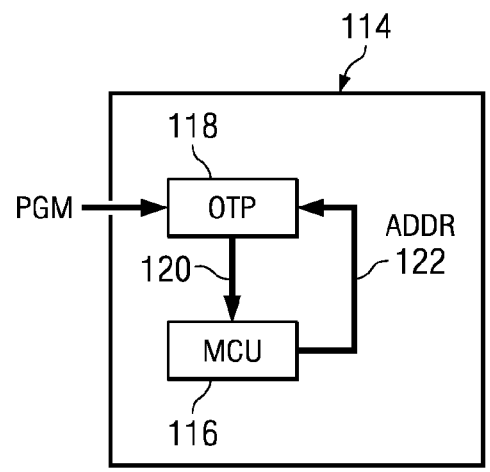

Referring now to FIG. 2, there is illustrated an alternate embodiment of a prior art integrated circuit 114, which includes an MCU 116 and one time programmable memory (OTP) 118. This allows data to be read therefrom on a data BUS 120 when addressed by an address BUS 122 with addresses thereon. This particular memory is not programmable internally but, rather, requires external programming. One such chip is manufactured by Silicon Laboratories Inc. under the part number C8051T600. The chip has the ability for external access to the OTP 118 to allow storage of program instructions and data via what is referred to as a C2 BUS. This is a two-wire BUS requiring a serial data line and a clock line. Both of the integrated circuits 102 and 114 are fabricated with different processes, with the integrated circuit 102 requiring a more complex process. However, the disadvantage to the integrated circuit 114, although it is a more economical product, is that the OTP 118 can only be programmed once and, thereafter, any changes to the part requires the purchase and programming of a new part.

Figure 3:
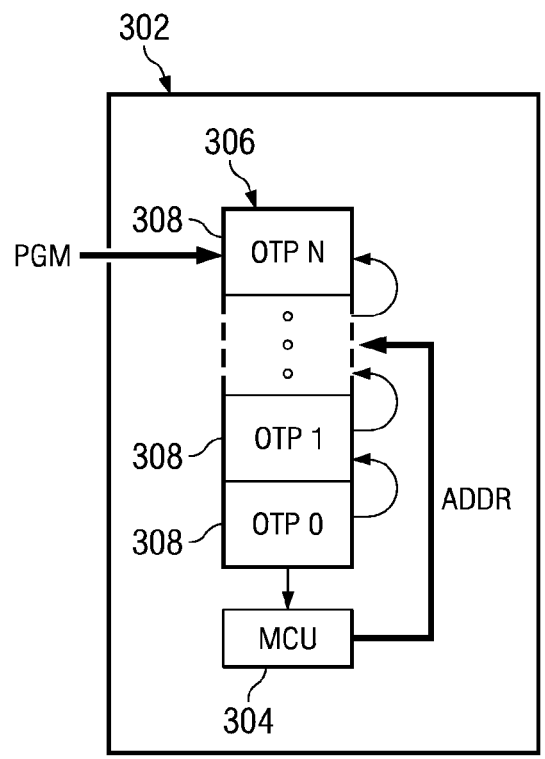
FIG. 3 illustrates a diagrammatic view of the integrated circuit in the present disclosure.

Referring now to FIG. 3, there is illustrated a diagrammatic view of an integrated circuit package 302 which contains an MCU 304 and a Multiple Time Programmable (MTP) memory 306. The MCU is a generic term for what is normally referred to as a system on a chip (SoC). This basically refers to a system that includes a digital section and an analog section such that mixed-signal processing technology is required. The digital portion typically has some type of microcontroller or microprocessor which is an instruction based engine. In the disclosed embodiment, this utilizes an 8051 core microprocessor, a very generic type of processor. This is interfaced with various types of circuitry to allow data to be received from sources external to the chip and output data from the chip. The analog section is typically comprised of an analog-to-digital converter and a digital-to-analog converter. These types of chips are used for numerous applications such as instrumentation devices, motor controllers and many other applications wherein analog signals must be sensed or sampled and then processing performed, and drive signals output to external devices in the analog domain. One type of chip utilized for such is the C8051 family of parts manufactured by Silicon Laboratories Inc. The overall architecture of the chip is described in detail in U.S. Pat. No. 7,171,542, issued Jan. 30, 2007, the entirety of which is incorporated herein by reference.

In general, the MCU portion thereof interfaces with various data memory and program memory. The program memory from which program instructions and configuration information is fetched during operation of the device is typically non-volatile memory, this being the MTP memory 306 in FIG. 3. However, there is also provided data memory which is of the volatile type or SRAM type memory. Typically, as described in U.S. Pat. No. 7,171,542, there will be two different address busses such that the program memory can be addressed in one address space and the data memory can be addressed in a second address space. Typically, the data memory utilizes both SRAM and special function registers (SFRs). All of the Program memory, with SRAM and the special function registers exist within the address space of the integrated circuit. When the part is initially powered up, the processor will access a reserved portion of the Program memory for predefined boot instructions. The program loaded into the user defined portion of the (that which is loaded by the user) Program memory will then be accessed and the part operated in the normal operating mode defined by those program instructions and configuration information also loaded in the user defined portion will be loaded into various Special Function Registers (SFRs) to configure the part and define various setpoints and the such.

The MTP memory 306 is configured with a plurality of OTP blocks 308. These are designated OTP0, OTP1, . . . OTPN. Each of these blocks has a defined size such that the total memory size of the MTP memory 306 is the size of each block 308 multiplied by a multiple of (N+1). The size of this particular memory can be altered such that the block size is variable, depending upon the configuration parameters associated therewith, as will be described herein below.

As will be described herein below, there is a defined block size, such that, for example, OTP0 block 308 will have a defined size of, for example 4K. Thus, the address space for the MCU 304 will define the OTP memory space as having an address that ranges from "$000_h$" to "$0FFF_h$," defining a 4K MTP programmable memory block. The MCU 304 only recognizes this 4K memory block as the available Program memory during execution of program instructions and anything above that address space is "outside" of the available Program memory space from the perspective of the MCU 304. During operation, the MCU 304 does not have the capability of addressing any of the other blocks or anything other than that 4K block of memory, this being the Program memory in which program instructions and configuration information are stored.

During a programming operation, there will be an initial program provided to the part by the user. As will be described herein below, at the factory, there will be a block of memory that is defined for the boot-up process and for certain debug routines defined as the DSR code. This is placed in a location that is accessible during boot-up and is defined by a boot-up sequence. In this boot-up sequence, the first time that these are programmed, prestored information in the MTP memory 306 enables the MCU 304 to address the MTP block 308 associated with the OTP0 block. This block is available for writing thereto (if not previously written to) and the external program operation which will be facilitated through an external program pin will allow programming of the MTP memory 306. Since this block is an OTP block, the initial state of all of the bits is a logic "1." Thereafter, if the logic state of any bit location in the addressable memory space from "$0000_h$" to "$0FFF_h$" needs to be lowered to a logic "0" state, this logic state will be programmed to that bit location and, at the end of the programming operation, it will constitute the fixed value. Of course, once the bit state is changed from a logic "1" to a logic "0," the state cannot be changed back. Thus, after programming, there is no way to alter the contents of the OTP0 block or whichever one of the blocks 308 is programmed. However, there is an indication made as to that particular block having been programmed. Upon a subsequent programming operation, the program will read a location within the MTP memory 306, this being stored within the program instruction storage area designated for the boot-up instructions and debug instructions, and the user will then write to the next available block. This is facilitated through an address decoding scheme that will be described herein below. This address decoding scheme merely receives an address of, for example, "$0000_h$," when the processor accesses the Program memory for the purpose of fetching an instruction or the such thereform and maps that address to the next higher block, block OTP1 if block OTP0 were the previous block, such that, for the second and next higher block, the initial starting address would be "$1000_h$," to effectively start the programming thereat. However, the processor is unaware of this mapping, as it only knows it is addressing "$0000_h$." Therefore, the external programming operation from the perspective of the processor does not need to know which of the "actual" addresses in the memory space of the MTP memory are to be addresses but, rather, it only need to know the logical address in the Program memory space of the processor. It needs to be noted that there are two address spaces to be considered, the Program memory address space of the processor and the MTP address space of the MTP memory. The boot-up procedure will cause information to be accessed from the MTP memory defining the where in the MTP address space to find the current program instructions and then map to that block for operation of the program.

For each subsequent programming operations, successive ones of the blocks 308 will be selected until the last block is selected. Once the last block is selected and programmed, i.e., written to, a subsequent programming operation beyond that can read the contents of the pre-stored memory Write status word (as will be described herein below) and make a determination that no more OTP is available for programming, at which time reprogramming will be denied. From the standpoint of the user, this is a rewritable program memory (until the last block is written to) and is very similar to FLASH. However, unlike FLASH, the additional manufacturing process steps are not required to provide the rewrite capability.

Figure 4:
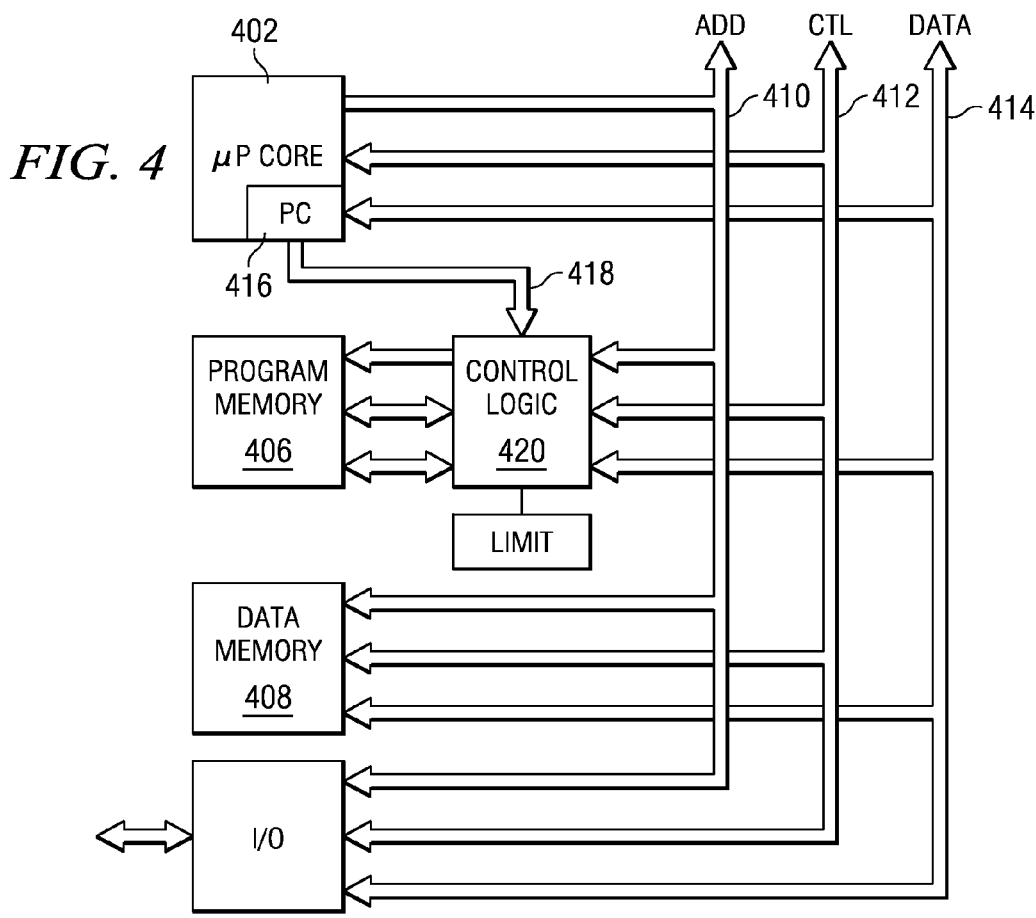
FIG. 4 illustrates a diagrammatic view of the memory interface for program memory and data memory.

Referring now to FIG. 4, there is illustrated a block diagram of the interface between a microprocessor core 402, an 8051 microprocessor core in the disclosed embodiment and as set forth in U.S. Pat. No. 7,171,542, program memory 406, the MTP memory 306 and data memory 408. The structure of this memory interface is disclosed in U.S. patent application Ser. No. 09/901,918, filed Jul. 9, 20001 and entitled "METHOD AND APPARATUS FOR PROTECTING INTERNAL MEMORY FROM EXTERNAL ACCESS," which is incorporated herein by reference in its entirety. The microprocessor core 402 is interfaced with an address bus 410, a control bus 412 and a data bus 414. There is provided a program counter 416 in the microprocessor core 402. This is used to provide an input to a control logic block 420 through a bus 418. The control logic block 418 provides an interface between the data bus 414, address bus 410 and control bus 412 to the program memory 406. Thus, addresses can address either the data memory or, when program memory is desired to be placed onto the bus, data memory 408 can be disabled through control signals, and data can be transferred to the data bus from the program memory 408. It is important to note that the program memory and the data memory both exist in separate address spaces such that the data memory and the program memory can both have a similar address location such as "$0000_h$," in common.

Figure 5:
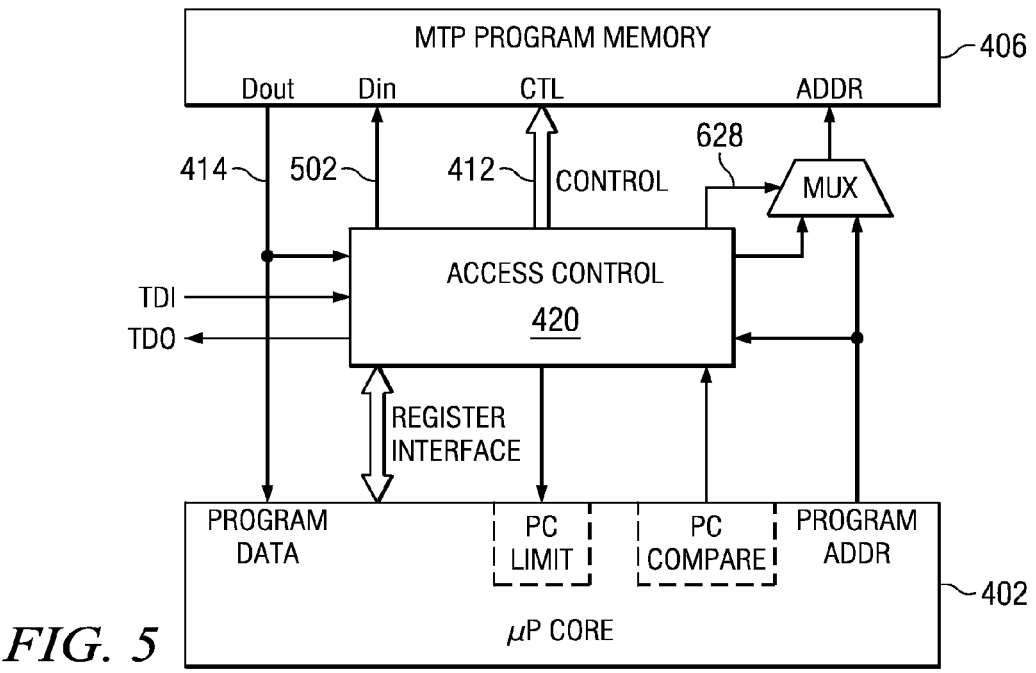
FIG. 5 illustrates a diagrammatic view of the access control for the program memory and the microprocessor.

Referring now to FIG. 5, there is illustrated a more detailed diagrammatic view of the interface between the program memory and the CPU 42. In general, it can be seen that there are provided limits to the program address, when generated by the microprocessor 402, that provide a particular address to the program memory 406. Data can be input thereto during programming on a data input 502, but this data input is not available during normal operation and after programming thereof. Control signals on the control bus 412 will define the control parameters for the program memory for use during programming and during a Read operation. During normal operation, the only operation that can occur is for data to be output on the data bus 414 which data is input as program data to the CPU. In general, although illustrated as common busses, there will typically be a program memory data bus and a separate data memory bus, typically referred to as a special function register (SFR) data bus. However, these could be common busses with use of control logic and the such.

Referring now to FIG. 6, there is illustrated a diagrammatic view of the operation of accessing the MTP memory 306. In this embodiment, the memory comprises 64K Bytes of memory. Each block of memory 308 is of a size of 4096 Bytes, there being a total of sixteen blocks. Of course, there could be a block size of 8192 Bytes with only 8 blocks of memory. Thus, for the 4096 Byte sized block 308, the first block will have an address range from "$0000_h$," to "$0FFF_h$," in the MTP memory address space with the next block having an address from "$1000_h$," through "$1FFF_h$," in the MTP memory address space and so on. The top memory address of the total memory is "$FFFF_h$," in the MTP memory address space which corresponds with 64K memory size. There is a particular reserved block of memory 602 in the MTP 306. This is designated as having an address range from "$FE00_h$," through "$FFFF_h$," in the MTP memory address space to define that block 602 in that memory space, it being noted again that this is not the Program memory space of the processor. This creates a slight aberration in the size of the uppermost block 308 initiated at the address "$F000_h$," in the MTP memory address space since this block contains the block 602. Therefore, the actual usable memory space in the block 308 initiated at "$F000_h$," will have less than 4096 Bytes. This will have 3584 Bytes of memory, with 512 Bytes associated with block 602. These 512 Bytes of memory space are associated with the various boot-up programs, debug programs, etc. in addition to a two Byte memory status word 608 that correspond to status information of the 16 OTP blocks 308, the "Status word." Each of the 16 OTP blocks 308 has an associated bit location in the Status word 608 and, if this associated bit location is a logic "0," this indicates that particular OTP memory block 308 has been written to. The uppermost "0" bit in the register indicates the current block of OTP memory 308 that is to be utilized. Therefore, if the first block of memory 308 from address "$000_h$," through "$0FFF_h$," in the MTP memory address space is the current active memory location, i.e., no higher bits in the Status word 608 are at a logic "0," then only the least significant bit in the two Byte Status word 608 will be written to a "0" logic state. This will indicate to the MCU 304 that the lowermost block 308 is the active block of OTP memory. Thus, by writing a logic "0" to the particular bit location in the two Byte space 608, a non-volatile record of the MTP memory can be maintained, indicating no further rewrites to this block 308.

Upon boot up, the system will access the memory location associated with the reserved block 602, i.e., the Program memory space of the processor will extend from "$0000_h$," to "$0FFF_h$," and also include "$FE00_h$," to "$FFFF_h$." Various boot up program instructions stored therein will be executed, one of which requires that the two Bytes of memory in Status word 608 be written to a particular SFR register 610 in the system. This SFR register 610 is part of the data memory. This can then be utilized for a memory mapping operation which allows a memory address received on an input memory address bus 612 to be modified with an offset block 614 through an offset generator 613. There will be a modified memory address bus 616 that will provide the modified memory address for addressing the program memory. For example, if the second block 308 of MTP were selected with the address ranging in its memory space from "$1000_h$" through "$1FFF_h$," this would require, for the first Byte location, a processor Program memory space address of "$0000_h$," to be mapped into the address "$1000_h$" in the MTP memory address space in order for the processor 402 to properly address the first Byte location in the MTP memory address space. To the MCU this is still the lowest address in the Program memory address space of the processor 402 as opposed to the actual address in the MTP memory address space. This will cause the correct data/instruction to be output therefrom. However, there must be some type of mapping decoder to allow the MCU to interface with the Program memory without modifying the address in the Program memory address space of the processor in certain situations. For example, if the address "$FE00_h$" in the block 602 were generated by the processor 402, it would not be necessary to have a modified or mapped memory address and, therefore, the offset block 614 would pass this address directly therethrough.

Referring now to FIG. 7, there is illustrated a diagram of the memory mapping operation. It can be seen that each of the blocks 308 is mapped by the offset block 614 and offset generator 613 to a memory block 308'. Thus, the address space for the block 308' would extend from "$0000_h$," through "$FFFF_h$," in the normal operation. Also in the address space and accessible by the CPU, is the address space "$FE00_h$" through "$FFFF_h$," to provide the 512 Bytes of memory for storing program number information associated with the two Bytes in status word 608, in addition to the boot-up operation, etc. However, as noted herein above, if the uppermost block in the MTP 306 had been selected, then the top 512 Bytes of memory therein would be unavailable for storage and the block 308' would not have a full 4096 Bytes of memory available but, rather 3584 Bytes of memory.

For the programming operation, the programming input is, in one embodiment, implemented on the C8051T600 part manufactured by the present assignee includes a two-wire debug interface referred to as the C2 interface. This allows programming and in-system debugging with the production part installed in the end application. The C2 interface operates using only two pins: a bi-directional data signal (C2D) and a clock input (C2CK). The operation of this bus is described in U.S. Pat. No. 6,968,472, issued Nov. 22, 2005 to Kenneth W. Fernald and assigned to the present assignee, which is incorporated herein by reference in its entirety.

Referring now to FIG. 8, there is illustrated a flow chart for programming the MTP. This is initiated at a block 802 and then proceeds to a block 804. In block 804, the operation is operable to read the two Byte value for the MTP status in the status word 608. Of course, upon boot-up, this can be loaded in the SFR or, the programming routine can force this to be read therein. The reason for this is that if the original value were loaded therein, this would attempt to write over the original program memory, which would be incorrect, as logic "0" states could not be changed. Thus, the two Byte value is read and then, one embodiment could allow pulling the next bit in the status word 608 to a logic "0" state in an increment operation, as indicated by a block 806. This value would then have to be loaded into the SFR through a function block 810. However, alternatively, the mapping device could be inhibited and the MCU address manipulated such that it could address the entire 64K of memory and the program allowed directly write to the desired address. Either operation could be operated. It is just important that, first, the correct portion of the memory that had not previously been written to be written to and that the status word 608 be written to correctly.

After the correct addressing scheme has been determined and the block to be written to has been selected, the program instructions are then downloaded to a function block 812 and then the program flows to a program operation to finalize the program and write to the status word 608, as indicated by a block 814. Of course, once that instruction is loaded onto the bus, it is then programmed into the MTP 306. The program then proceeds to a block 816 when completed.

In an alternate embodiment, it is possible to redefine the boundary for the block size of block 308. For example, it may be that a 64K memory could be divided into 2K blocks, 4K blocks or 8K blocks. In this embodiment, there are provided two Bytes of memory with 16 available bit locations. For a 64K memory, this would easily accommodate one bit for each of the 16 4K blocks. However, it may be that the user wanted to utilize 8K blocks, there only being provided eight of these. To define this boundary, the user would, in one embodiment, write a logic "0" to the most significant bit in the two Byte status word_608, this being a status word 608' as illustrated in FIG. 9. In this illustration, the eight blocks would only be defined by the lowermost Byte. Thus, when the status word 608 is initially examined and there is an indication that all of the lower bit locations in the uppermost Byte were not a logic "0" but the uppermost or most significant bit were a logic "0," this would indicate that this memory had been mapped to an 8K block size. Of course, if it were written to a 16K block size, then the two most significant bits in the uppermost Byte would be written to a logic "0" state and only four bit locations in the lowermost Byte could be written to. This is easily facilitated in the programming operation and in the mapping configuration.

It will be appreciated by those skilled in the art having the benefit of this disclosure that this invention provides an integrated circuit with MTP memory disposed thereon that is emulated with OTP memory blocks. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An integrated circuit having an embedded multiple time programmable memory, comprising:

a processing core for executing stored instructions;

a data memory for storing data during operation of said processing core, said data memory occupying a data memory address space of said processing core;

a non-volatile memory for storing program instructions for use by said processing core during operation thereof, wherein at least portions of said stored program instructions are executed from non-volatile memory, said non-volatile memory including:

a plurality of blocks of non-volatile memory, each of which can be written to once and read from many times and each having a size that is equal to or less than a program memory address space addressable by said processing core for output of data therefrom, and a reserve storage location for storing a status word defining the one of said plurality of blocks addressable by said processing core, said status word operable to be changed in response to external signals when another of said plurality of blocks is to be selected, such that once another of said plurality of blocks is selected, said status word cannot indicate as addressable by said processing core a prior one of said plurality of blocks that was defined by said status word as being previously addressable by said processing core; and an access device for enabling a program memory address within the program memory address space of said processing core to address a corresponding addressable location within the one of said plurality of blocks indicated by said status word as being accessible by said processing core.

2. The integrated circuit of claim 1 wherein said data memory is a volatile data memory.

3. The integrated circuit of claim 1 wherein said reserve storage location is operable to store initiating program instructions that are accessible by said processing core for execution thereby when the integrated circuit is placed into an operational mode from a non-operational mode.

4. The integrated circuit of claim 1 wherein each of said plurality of blocks in said non volatile memory contains no information therein prior to said status word defining such one of said plurality of blocks as being addressable by said processing core and wherein information is stored in the one of said plurality of blocks defined by said status word as being addressable by said processing core in conjunction with the status word being changed.

5. The integrated circuit of claim 1, wherein said non volatile memory comprises a multiple time programmable (MTP) memory of a size that has an address space larger than the program memory space of said processing core.

6. The integrated memory of claim 5, wherein said MTP memory can be parsed into a plurality of logically addressable MTP memory blocks, each corresponding to one of said plurality of blocks of non volatile memory and each of said MTP memory blocks logically addressable in an MTP memory address space of said MTP memory.

7. The integrated memory of claim 6, wherein said access device comprises a memory address mapping device for mapping a program memory address generated by said processing core to the corresponding MTP memory address associated with the one of said MTP memory blocks defined by said stored status word.

8. The integrated circuit of claim 7, wherein said mapping device has access to said reserve storage location for accessing said status word.

9. The integrated circuit of claim 6, wherein said MTP memory blocks and said program memory space are variable in size and defined by said status word.

10. The integrated circuit of claim 1, wherein said reserve storage location is accessible by said processing core when going from a non operational mode of operation to an operational mode of operation.

11. An integrated circuit having an embedded multiple time programmable memory, comprising:

a program address space of a defined size;

a multiple time programmable (MTP) non-volatile memory block for storing program instructions for use during an operational mode of the integrated circuit, said MTP memory block operating within an MTP address space, said MTP memory including:

a plurality of MTP blocks of non-volatile memory, each of which can be written to once and read from many times and each having a size that is equal to or less than said program address space, and a reserve storage location for storing a status word defining the one of said plurality of MTP blocks that can be addressed from within said program address space, said status word operable to be changed in response to external signals when another of said plurality of MTP blocks is to be selected, such that once another of said plurality of MTP blocks is selected, said status word cannot indicate as addressable within said program address space a prior one of said plurality of MTP blocks that was defined by said status word as being previously addressable within said program address space; and an access device for enabling a program memory address within the program memory address space to address a corresponding addressable location within the one of said plurality of MTP blocks indicated by said status word as being addressable within said program address space.

12. A method for storing program instructions in an integrated circuit, comprising the steps of:

defining a program address space of a defined size;

providing an embedded multiple time programmable (MTP) non-volatile memory block in the integrated circuit for storing program instructions for use during an operational mode of the integrated circuit, and the MTP memory block operating within an MTP address space;

parsing the MTP memory into a plurality of MTP blocks of non-volatile memory, each of which can be written to once and read from many times and each having a size that is equal to or less than the program address space;

defining a reserve storage location within the MTP memory and storing therein a status word defining the one of said plurality of MTP blocks that can be addressed from within said program address space, the status word operable to be changed in response to external signals when another of the plurality of MTP blocks is to be selected, such that once another of the plurality of MTP blocks is selected, the status word cannot indicate as addressable within the program address space a prior one of the plurality of MTP blocks that was defined by said status word as being previously addressable within said program address space; and enabling a program memory address within the program memory address space to address a corresponding addressable location within the one of the plurality of MTP blocks indicated by the status word as being addressable within the program address space.

* * * * *